US010719606B2

(12) United States Patent
Sanchez Diaz et al.

(10) Patent No.: US 10,719,606 B2
(45) Date of Patent: Jul. 21, 2020

(54) SECURITY PROCESSOR FOR AN EMBEDDED SYSTEM

(71) Applicant: Infineon Technologies AG, Neubiberg (DE)

(72) Inventors: Oscar David Sanchez Diaz, Fremont, CA (US); Jurijus Cizas, Fremont, CA (US); Jeffrey Kelley, Plymouth, MA (US); Mark Stafford, Morgan Hill, CA (US)

(73) Assignee: Infineon Technologies AG, Neubiberg (DE)

( * ) Notice: Subject to any disclaimer, the term of this patent is extended or adjusted under 35 U.S.C. 154(b) by 261 days.

(21) Appl. No.: 15/903,227

(22) Filed: Feb. 23, 2018

(65) Prior Publication Data

US 2019/0266331 A1    Aug. 29, 2019

(51) Int. Cl.
*G06F 21/57* (2013.01)
*G06F 21/51* (2013.01)
(Continued)

(52) U.S. Cl.
CPC ........ *G06F 21/575* (2013.01); *G06F 11/1458* (2013.01); *G06F 21/44* (2013.01);
(Continued)

(58) Field of Classification Search
CPC .... G06F 21/575; G06F 11/1458; G06F 21/44; G06F 21/51; G06F 21/572; G06F 21/606;
(Continued)

(56) References Cited

U.S. PATENT DOCUMENTS 9,343,711 B2 * 5/2016 Sasakawa ............... H01M 2/02
2002/0023212 A1 * 2/2002 Proudler ............. G06F 11/3476
713/164
(Continued)

FOREIGN PATENT DOCUMENTS

EP    1429224 A1    6/2004

OTHER PUBLICATIONS

C. Ramsey, et al., "Tempest Attacks Against AES", 10 pages, (Date: Unknown).
(Continued)

*Primary Examiner* — Aurel Prifti
(74) *Attorney, Agent, or Firm* — Schiff Hardin LLP (57) ABSTRACT

Dynamic Trust Manager (DTM) having an interface coupled to an embedded system including an Application Processor (AP), boot media, and security processor. The security processor, at a start of a boot sequence of the AP, prevents the AP from proceeding with the boot sequence, verifies bootloader code stored in the boot media via boot media access, and if the bootloader code verification is successful, allows the AP to proceed using the verified bootloader code. The security processor may also be configured to activate an interrupt request of the AP during runtime, request the AP to execute a Security Monitor Driver (SMD) of the embedded system to measure an integrity information of code/data stored in an embedded system memory, receive from the SMD the measured integrity information of code/data, and verify whether the measured integrity information equals a reference integrity information stored in an integrity table of a DTM memory.

6 Claims, 7 Drawing Sheets

(51) Int. Cl.
*G06F 21/60* (2013.01)
*G06F 21/64* (2013.01)
*G06F 11/14* (2006.01)
*G06F 21/44* (2013.01)
*G06F 9/445* (2018.01)

(52) U.S. Cl.
CPC ............ *G06F 21/51* (2013.01); *G06F 21/572* (2013.01); *G06F 21/606* (2013.01); *G06F 21/64* (2013.01); *G06F 9/445* (2013.01); *G06F 2201/84* (2013.01); *G06F 2221/033* (2013.01)

(58) Field of Classification Search
CPC ...... G06F 21/64; G06F 9/445; G06F 2201/84; G06F 2221/033
See application file for complete search history.

(56) References Cited

U.S. PATENT DOCUMENTS

| | | | | |
|---|---|---|---|---|
| 2003/0172265 | A1* | 9/2003 | Vu | G01S 13/9023 713/164 |
| 2006/0179293 | A1* | 8/2006 | O'Connor | G06F 21/31 713/1 |
| 2008/0182592 | A1* | 7/2008 | Cha | H04L 63/04 455/456.3 |
| 2011/0010543 | A1* | 1/2011 | Schmidt | H04W 12/10 713/168 |
| 2011/0087872 | A1* | 4/2011 | Shah | H04L 9/3236 713/2 |
| 2012/0226895 | A1* | 9/2012 | Anderson | G06F 21/575 713/2 |
| 2013/0013906 | A1* | 1/2013 | Brown | G06F 21/575 713/2 |
| 2013/0061032 | A1* | 3/2013 | Suginaka | G06F 9/4401 713/2 |
| 2013/0124840 | A1* | 5/2013 | Diluoffo | G06F 21/575 713/2 |
| 2013/0124843 | A1* | 5/2013 | Bobzin | G06F 21/575 713/2 |
| 2013/0297920 | A1* | 11/2013 | Liu | G06F 1/24 713/1 |
| 2014/0089655 | A1* | 3/2014 | Lambert | G06F 11/1417 713/2 |
| 2014/0304497 | A1* | 10/2014 | Park | G06F 9/4406 713/2 |
| 2014/0317394 | A1* | 10/2014 | Buhler | G06F 9/4416 713/2 |
| 2015/0113258 | A1* | 4/2015 | Grieco | G06F 21/572 713/2 |
| 2016/0094523 | A1* | 3/2016 | Houghton | H04L 63/0428 713/150 |
| 2016/0274918 | A1* | 9/2016 | Moon | G06F 21/57 |
| 2019/0005271 | A1* | 1/2019 | Subramony | G06F 21/575 |
| 2019/0012483 | A1* | 1/2019 | Thompson | G06F 21/604 |

OTHER PUBLICATIONS

C. J. Mitchell, "Research Workshop on Future TPM Functionality: Final Report", 10 pgs., Sep. 9, 2006.
Microsemi, "Microsemi Secure Boot Reference Design", 19 pgs., 2014.

* cited by examiner

Figure 1

Figure 2A
(Bootloader Code Verification)

Figure 3A (Bootloader Code Execution)

Figure 3B

SECURITY PROCESSOR FOR AN EMBEDDED SYSTEM

BACKGROUND

Software running within embedded systems is becoming larger and more complex, thereby increasing software attack surfaces. Conventional defenses provide protection, but fail when an attack disables or bypasses the defense.

Conventional security techniques for software integrity verification and policy enforcement are generally executed within the embedded system being protected. One example security technique performs a one-way hash operation and compares a resulting digest with a trusted reference. Another more complex security technique uses a tamper detector which loads a program from nonvolatile memory, monitors the program's integrity with converters which obtain a value, and compares this obtained value with a trusted reference value. If the comparison fails, the tamper detector stops program execution.

The conventional security techniques are disadvantageous when an attack bypasses the embedded system's security. The embedded system cannot stop the attack because these conventional security techniques rely on the same embedded system being protected.

DETAILED DESCRIPTION

The present disclosure is directed to a Dynamic Trust Manager (DTM) configured to verify the integrity of software running within an embedded system, and/or enforcement of security policies related to this software in the event the software is maliciously altered.

I. Secure System Generally

Figure 1:
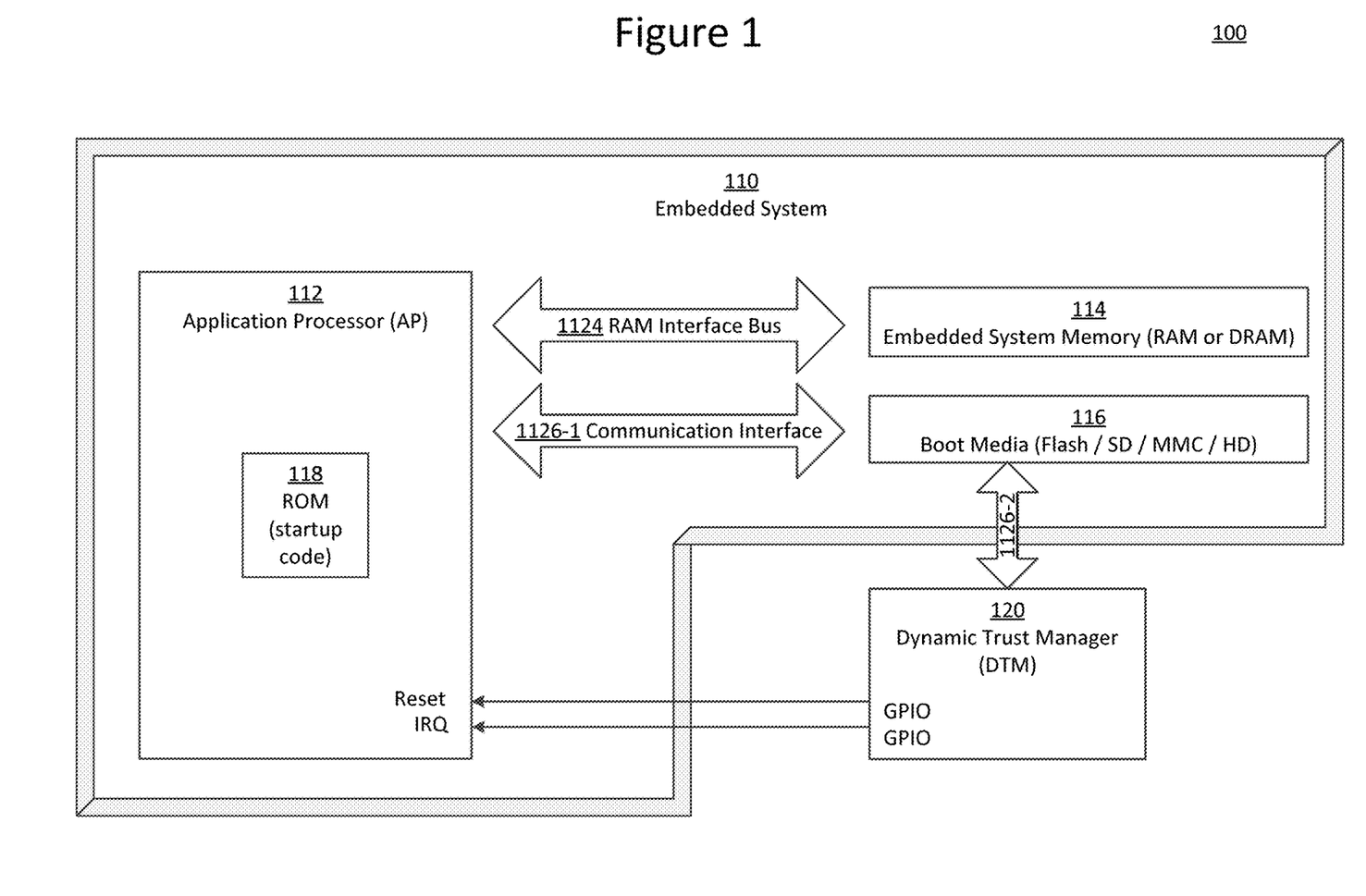
FIG. 1 illustrates a schematic diagram of a secure system including an embedded system and Dynamic Trust Manager (DTM) in accordance with aspects of the disclosure.

FIG. 1 illustrates a secure system 100 comprising an embedded system 110 and Dynamic Trust Manager (DTM) 120 in accordance with aspects of the disclosure.

The DTM 120 is independent of the embedded system 110 it protects. The DTM 120 is configured to identify and stop a threat by enforcing a security policy.

The embedded system comprises an Application Processor (AP), an embedded system memory 114, and a boot media 116.

The AP 112 comprises a Read Only Memory (ROM) 118 which stores startup code. The AP 112 also comprises a reset line and an interrupt request line IRQ which are communicatively coupled to the DTM 120.

The embedded system memory 114 may be any Random Access Memory (RAM), such as Dynamic Random Access Memory (DRAM), Static Random Access Memory (SRAM), Synchronous DRAM (SDRAM), Double Data-Rate (DDR) SDRAM, etc. An interface bus 1124 communicatively couples the embedded system memory 114 and the AP 112.

The boot media 116 may be a flash memory, a Secure Digital (SD) memory, a Multi Media Card (MMC), a Hard Drive (HD), or the like. A communication interference bus 1126, which may be a Serial-Parallel Interface (SPI) as described in more detail below or a Serial ATA (SATA) interface, comprises two portions. The first portion of the communication interference bus 1126-1 communicatively couples the boot media 116 and the AP 112. The second portion of the communication interference bus 1126-2 communicatively couples the boot media 116 and the DTM 120.

The DTM 120 is located outside of the embedded system 110. The DTM 120 comprises one or more General Purpose Input Output lines (GPIO), which in this case are respectively coupled to the AP 112's reset line and interrupt request line IRQ. While the DTM 120 is shown in this example as being located outside of the embedded system, the DTM 120 could alternatively be located within the embedded system 110, as long as the DTM 120 is protected by sufficient security, such as a firewall.

II. Secure System Operation Overview

The DTM 120 enforces a secure boot of the AP 112 when the AP 112 does not have its own secure boot option, or its secure boot option is compromised.

At power up, a bootloader code is verified before allowing the AP 112 to boot. More specifically, the DTM 120 prevents the AP 112 from booting by maintaining the reset line of the AP 112 in an active state. Meanwhile, the DTM 120 verifies, and corrects if required, the integrity of the bootloader code stored in the boot media 116. After this bootloader code is verified, the DTM 120 deactivates the reset line, thereby allowing the AP 112 to continue to boot using the verified bootloader code. The DTM 120 also ensures that the verified bootloader code is properly loaded from the boot media 116 to the embedded system memory 114 for execution by the AP 112.

During runtime, the DTM 120 performs integrity checks of any critical code being executed by the AP 112 from the embedded system memory 114. More specifically, the DTM 120 requests a Security Monitor Driver (SMD) 11442 in the embedded system memory 114 to perform an integrity check of code and to report resulting integrity metrics. The DTM 120 compares the reported integrity metrics with reference values. Based on the comparison and security policies for various portions of code, the DTM 120 may decide to perform an action. The action may be, for example, to instruct the SMD 11442 to recover corrupted code from a backup, kill and restart corrupted code, or reset and reboot the AP 112 by activating the reset line.

III. Secure System During Bootloader Code Verification

Figure 2A:
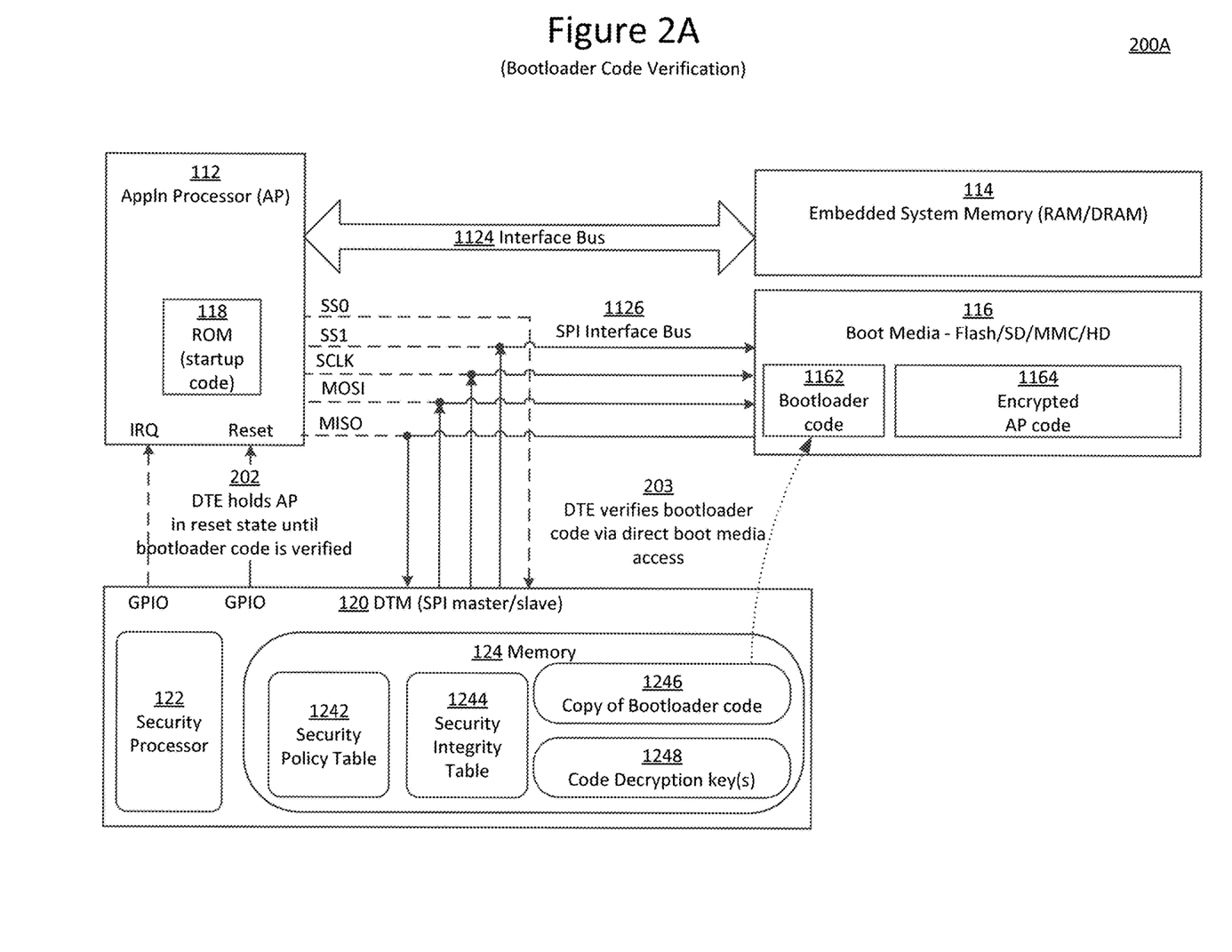
FIG. 2A illustrates a schematic diagram of the secure system of FIG. 1 performing bootloader code verification in accordance with aspects of the disclosure.
Figure 2B:
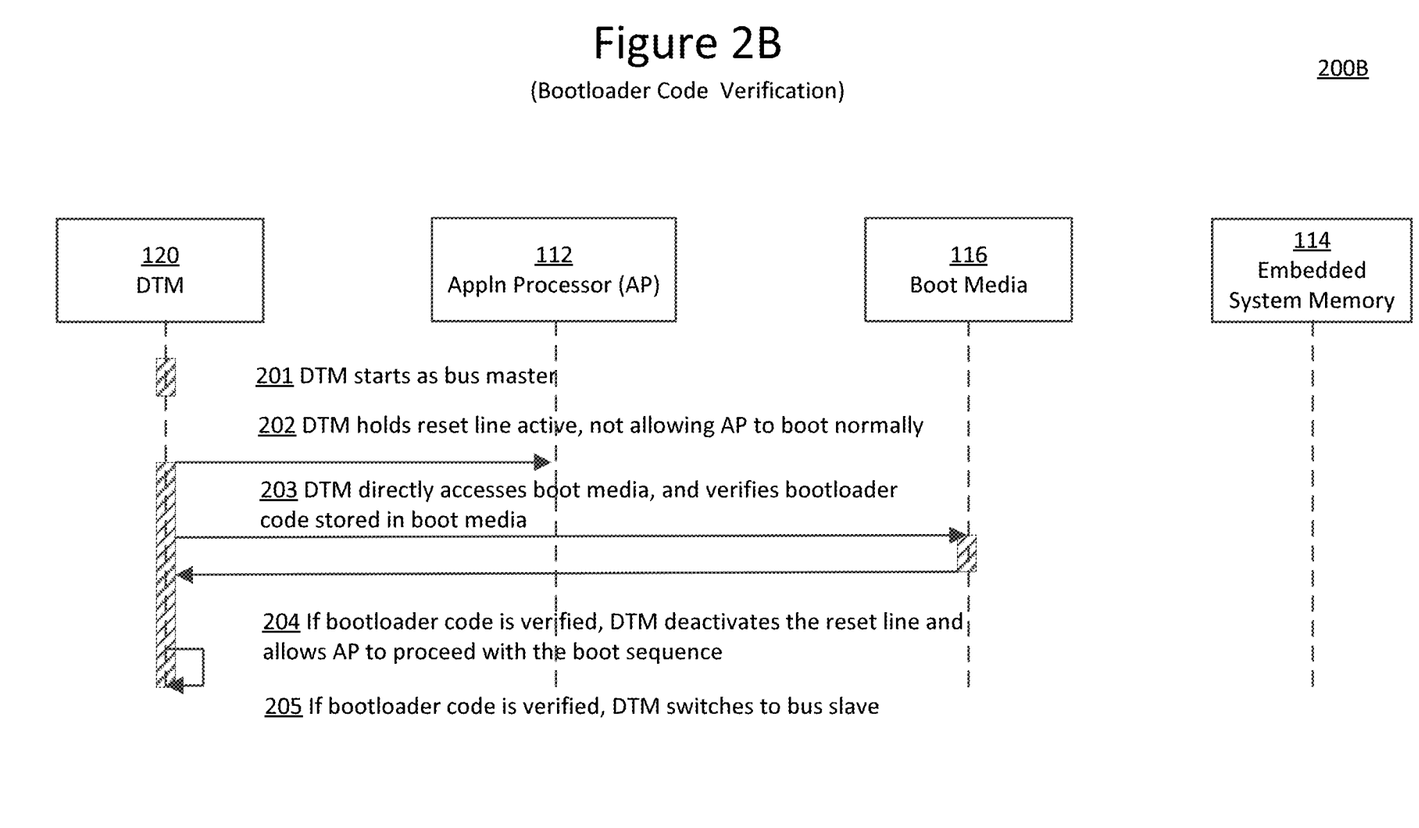
FIG. 2B illustrates a flow diagram of the bootloader code verification of FIG. 2A in accordance with aspects of the disclosure.
Figure 3A:
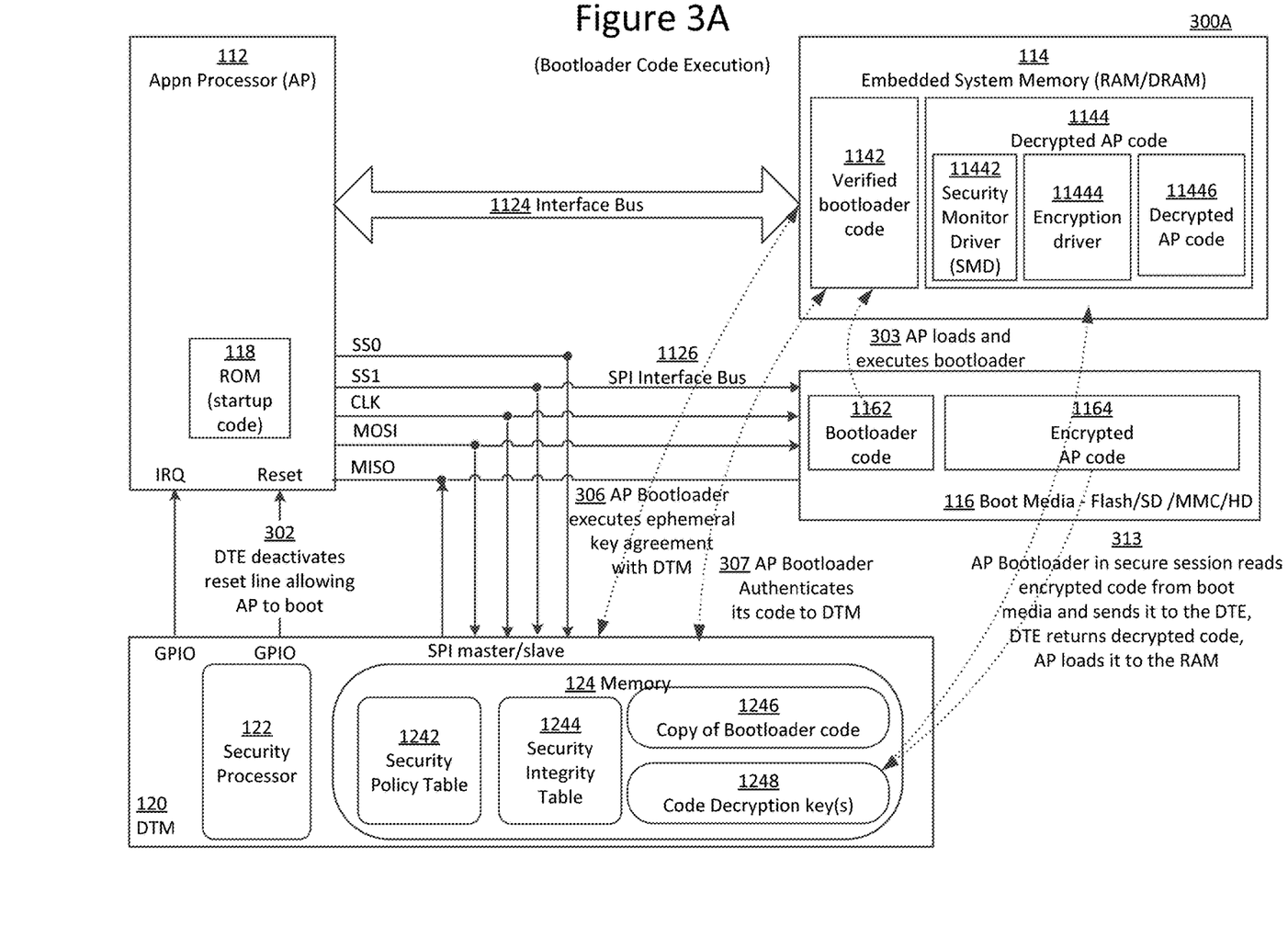
FIG. 3A illustrates a schematic diagram of the secure system of FIG. 1 performing bootloader code execution in accordance with aspects of the disclosure.
Figure 4A:
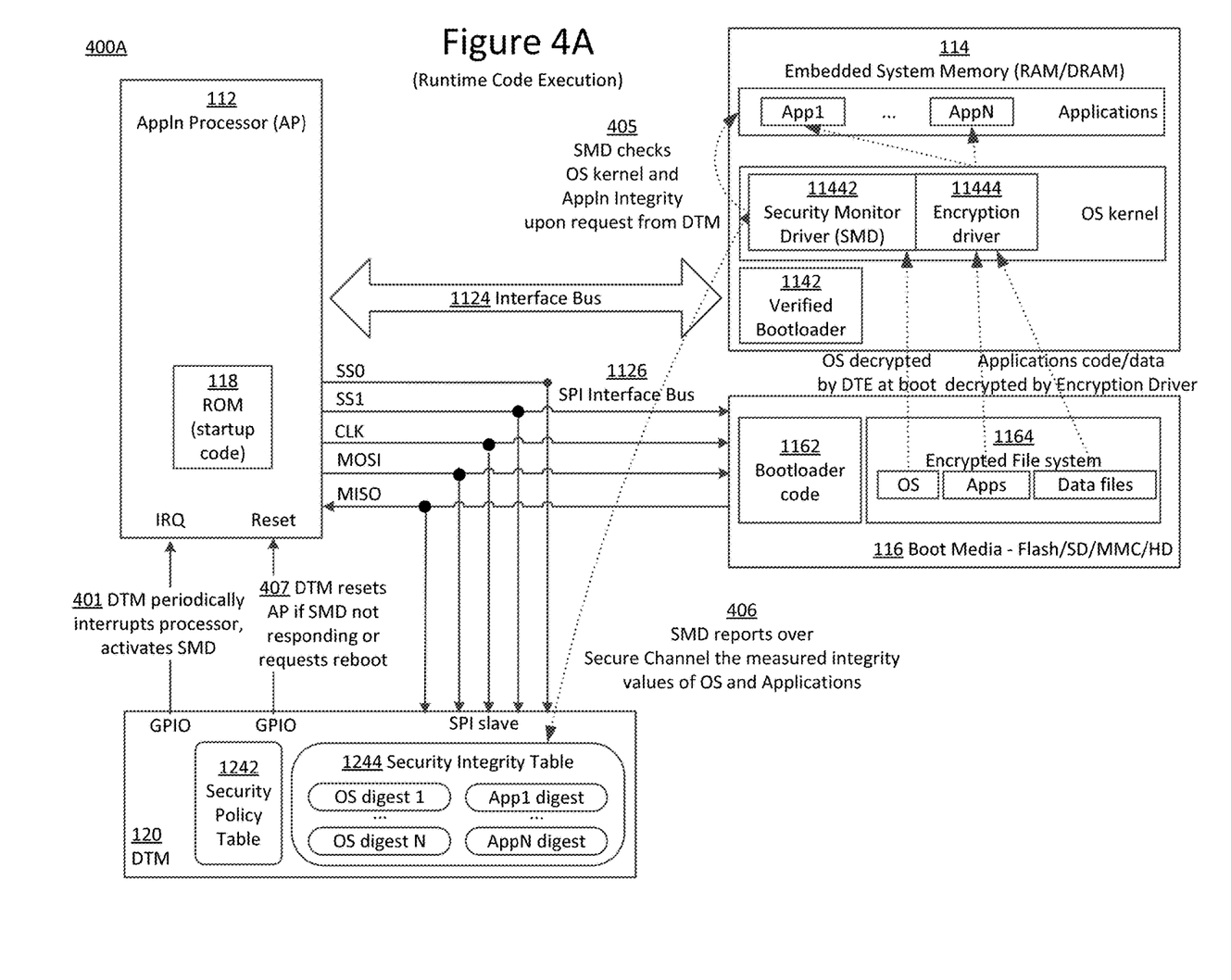
FIG. 4A illustrates a schematic diagram of the secure system of FIG. 1 performing runtime code execution in accordance with aspects of the disclosure.

FIG. 2A illustrates a schematic diagram 200A of the secure system of FIG. 1 performing bootloader code verification, and FIG. 2B illustrates a corresponding flow diagram 200B of communication between the DTM 120, AP 112, and boot media 116 in accordance with aspects of the disclosure. The solid lines in FIG. 2A, and also in FIGS. 3A and 4A, represent a physical connection with active signals, the dashed lines represent a physical connection without active signals, and the dotted lines represent a logical connection.

The DTM 120 comprises a security processor 112 and a memory 124. The memory 124 is configured to store a security policy table 1242, a security integrity table 1244, a copy of the bootloader code 1246, and one or more code decryption keys 1248. The security policy table 1242 comprises a set of security rules including references to the security integrity table 1244 and actions to be taken in case of policy violation, as shown in FIG. 4A. The security integrity table 1244 stores digital signatures or digests of one or more data or code sections to be protected. Each element in the security integrity table 1244 can be referenced by one or more elements in the security policy table 1242. The copy of the bootloader code 1246 may comprise a reference copy, digest, or signature of the bootloader code. This bootloader code 1246 is optionally not be encrypted because it may be used as a restoration tool in the event the bootloader code 1162 stored in the boot media 116 becomes compromised.

The boot media 116 is configured to store bootloader code 1162 in plain text and optionally encrypted AP code 1164. The encrypted AP code 1164 may be encrypted and hashed, signed, or Message Authentication Coded (MACed, i.e., comprises data that is a crypto digest of the bootloader code), for example.

The DTM 120 can be coupled to the AP 112 and the boot media 116 via a Serial-Parallel Interface (SPI) bus 1126 (comprising 1126-1 and 1126-2 from FIG. 1. As is known, SPI is a synchronous serial communication interface specification used for short distance communication, primarily in embedded systems. An SPI bus specifies four logic signals: a Serial Clock SCLK, Master Output Slave Input MOSI, Master Input Slave Output MISO, and Slave Select SS. The SPI bus can operate with a single bus master and with one or more bus slaves.

An SPI bus is merely an example bus interface. Alternative bus interfaces are possible, such as Serial Advanced Technology Attachment (SATA), the standard interface for connecting Solid State Drives (SSDs). The ROM startup code may be designed to enable the DTM master mode via a SATA bus interface to perform pre-boot verification of the bootloader code stored on a SSD (i.e., boot media)

By way of overview, the DTM 120 powers on, and then releases the reset line of the AP 110 of the embedded system 110 it is protecting only if an integrity verification of the bootloader code stored in the boot media 116 is successful. Then, the bootloader code is loaded from the boot media 116 to the embedded system memory 114 and executed there by the AP 112. This bootloader code has been verified by the DTM 120, and thus can be trusted.

More specifically, at a start of a boot sequence, the DTM 120 is the bus master (201 in FIG. 2B). The security processor 122 of the DTM 120 is configured to prevent the AP 112 from proceeding with the boot sequence by holding the AP 112 in a set state (202). In this example, the DTM 120, through its GPIO line, maintains the AP 112's reset line active, so the AP 112 cannot boot. Alternative techniques for preventing the AP 112 from booting include, but are not limited to, executing a specially designed portion of ROM startup code awaiting bootloader verification confirmation from the DTM 120, activating the AP 112's sleep or shutdown mode, disconnecting the boot media 116 from the AP 112 using bus drivers or electronic switches, causing the AP 112 to execute another internal or external code, and deactivating the AP 112's power supply.

The security processor 122 verifies bootloader code stored in the boot media 116 via direct boot media access (203). More specifically, the DTM 120 reads the bootloader code 1162 from the boot media 116 and verifies its integrity. This verification can be performed using an algorithm based on a digest, signature, MAC, authentication code, or the like. If the bootloader code verification is successful, the security processor 122 deactivates the reset line and allows the AP 112 to proceed with the boot sequence using the verified bootloader code (204); also, the DTM 120 gives up execution control to the AP 112 by becoming the bus slave and the AP 112 becoming the bus master (205).

If the bootloader code verification fails, on the other hand, the DTM 120 continues to prevent the AP 112 from proceeding with the boot sequence with the unverified bootloader code. The security processor 122 may be optionally configured to overwrite the bootloader code 1162 stored in the boot media 116 with a trusted copy of bootloader code stored in the DTM memory 124. Alternatively, the security processor 122 may be configured to allow the AP 112 to proceed with the boot sequence using a DTM-trusted/verified copy of bootloader code stored at a different address of the boot media 116, or alternatively, in another boot media external to the DTM 120.

The DTM 120 may be configured to verify a copy of the bootloader code stored external to the DTM 120 using any trusted verification technique (e.g., hash or signature) with a root of trust (e.g., reference digest or bootloader code signer public key) stored securely in the DTM memory 1246. The root of trust reference and the bootloader code cannot be modified unless proper access credentials are provided (e.g., a password). Further, the trusted copy of the bootloader code may be encrypted using an encryption key stored securely in the DTM memory 1248.

IV. Secure System During Bootloader Code Execution

Figure 3B:
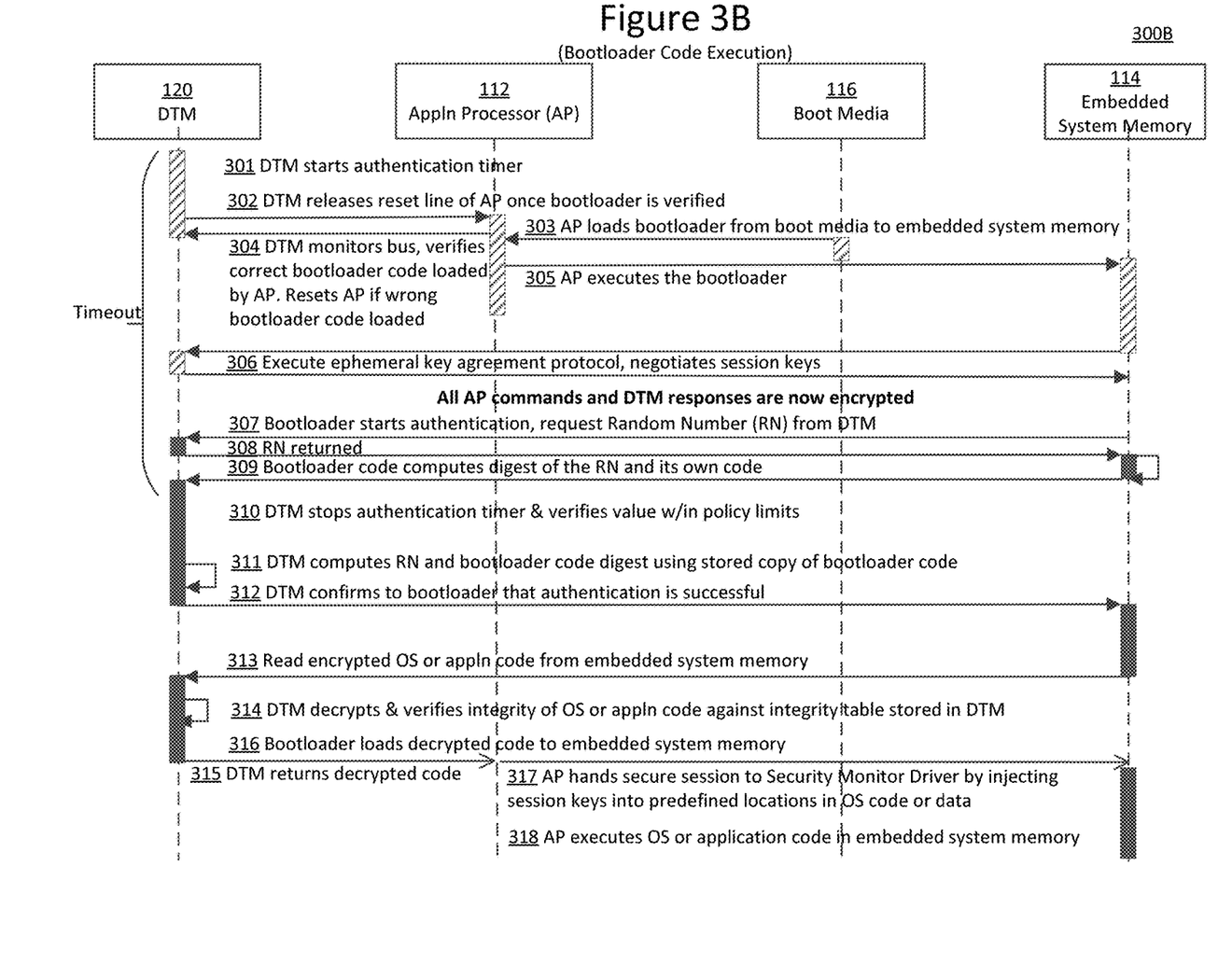
FIG. 3B illustrates a flow diagram of the bootloader code execution of FIG. 3A in accordance with aspects of the disclosure.

FIG. 3A illustrates a schematic diagram 300A of the secure system of FIG. 1 performing bootloader code execution, and FIG. 3B illustrates a corresponding flow diagram 300B of communication between the DTM 120, AP 112, boot media 116, and embedded system memory 114, in accordance with aspects of the disclosure.

The bootloader code execution comprises the DTM 120 releasing remaining portions of software stored securely in the DTM memory 120 to the embedded system 110 to finalize the start-up boot sequence only after bootloader code verification (i.e., pre-bootloader sequence) is successful.

The embedded system memory 114 is configured to store verified bootloader code 1142 and decrypted AP code 1144. The decrypted AP code 1142 comprises a Security Monitor Driver (SMD) 11442, and encryption driver 11444, and decrypted AP code 11446.

A secure channel is established between the SMD 11442 and the DTM 120 so that an attacker cannot perform a "man-in-the-middle attack." This secure channel is established during start of the boot process and maintained in order to ensure the integrity of the entire boot process.

For the bootloader code execution, the DTM 120 starts an authentication timer (301). If the verification of the bootloader code stored in the boot media 116 is successful, the DTM 120 releases the reset line of the AP 112 signal, and the AP 112 can start booting (302). The AP 112 is then configured to use its ROM startup code 118 to proceed with the boot sequence by loading the verified bootloader code 1142 from the boot media 116 to the embedded system memory 114 for execution by the AP 112 (303).

The security processor 122 of the DTM 120 is configured to monitor whether the verified bootloader code is loaded from the boot media 116 to the embedded system memory 114 for execution by the AP 112 is properly loaded (304). If the verified bootloader code 1142 is not properly loaded from the boot media 116 to the embedded system memory 114, the security processor 112 is configured to reset the AP 112 or prevent the AP 112 from proceeding with the boot sequence (304). On the other hand, if the verified bootloader code is loaded properly, the AP 112 executes the bootloader code from the embedded system memory 114 via the interface bus 1124 (305).

The DTM 120 and the SMD 11442 stored in the embedded system memory 114 execute an ephemeral key agreement protocol to negotiate session keys (306). From this point on, all AP commands and DTM responses are encrypted, as indicated by the solid, vertical bars in FIGS. 3B and 4B.

The security processor 122 is configured to authenticate within the DTM 120 a copy of the bootloader code from the embedded system memory 114 (307). This authentication may be based on a reference copy, digest, or signature of bootloader code. More specifically, the bootloader code execution starts the authentication by requesting from the DTM 120 a Random Number (RN) (307), and in response the DTM 120 returns a RN (308). The bootloader code execution computes digests of the RN and its own code (309). The DTM 120 then stops the authentication timer and verifies that the stop time is within policy limits (310). If the bootloader code execution takes longer than a predetermined amount of time, the DTM 120 assumes there is a problem and can perform an action (e.g., a reset of the AP 112) based on a security policy. In such a case, the DTM 120 may compute a RN and bootloader code digest using its stored copy of bootloader code 1246 (311). However, hopefully the DTM 120 is able to confirm that the copy of the bootloader code 1142 stored in the embedded system memory 114 is authentic (312).

The authentication process in this example involves a RN, but the disclosure is not limited in this respect. Alternatively, the authentication process may be based on a digital signature or hash. The DTM 120 may verify if the digital signature or hash provided by the embedded system is authentic.

Next, bootloader code 1142 is configured to send encrypted code 1164 from the boot media 116 (313) to the security processor 122, which decrypts the encrypted code 1164 using a decryption key 1248 stored in the DTM memory 124 only (314), verifies integrity of the decrypted code using the security integrity table 1244 (314), and sends the decrypted code to the embedded system memory 114 (316). At this point the embedded system 114 is storing verified code that can be trusted, including the SMD 11442. The AP 112 then hands the secure session to the SMD 11442 by any defined protocol, for example, injecting session keys into predefined locations in the code or data (317). The AP 112 is then configured to execute application code from the embedded system memory 114 (318).

The security policy table 1242 may be completed by the system designer or system administrator according to what actions are to be taken under particular conditions. Also, the security policy table 1242 may be changed later in a product life cycle by a person with appropriate authorization, which may be part of the security policy table 1242. The AP 112 will know which process has a potential issue, and the security policy table 1242 is configured to store a policy for the process.

V. Secure System During Runtime

Figure 4B:
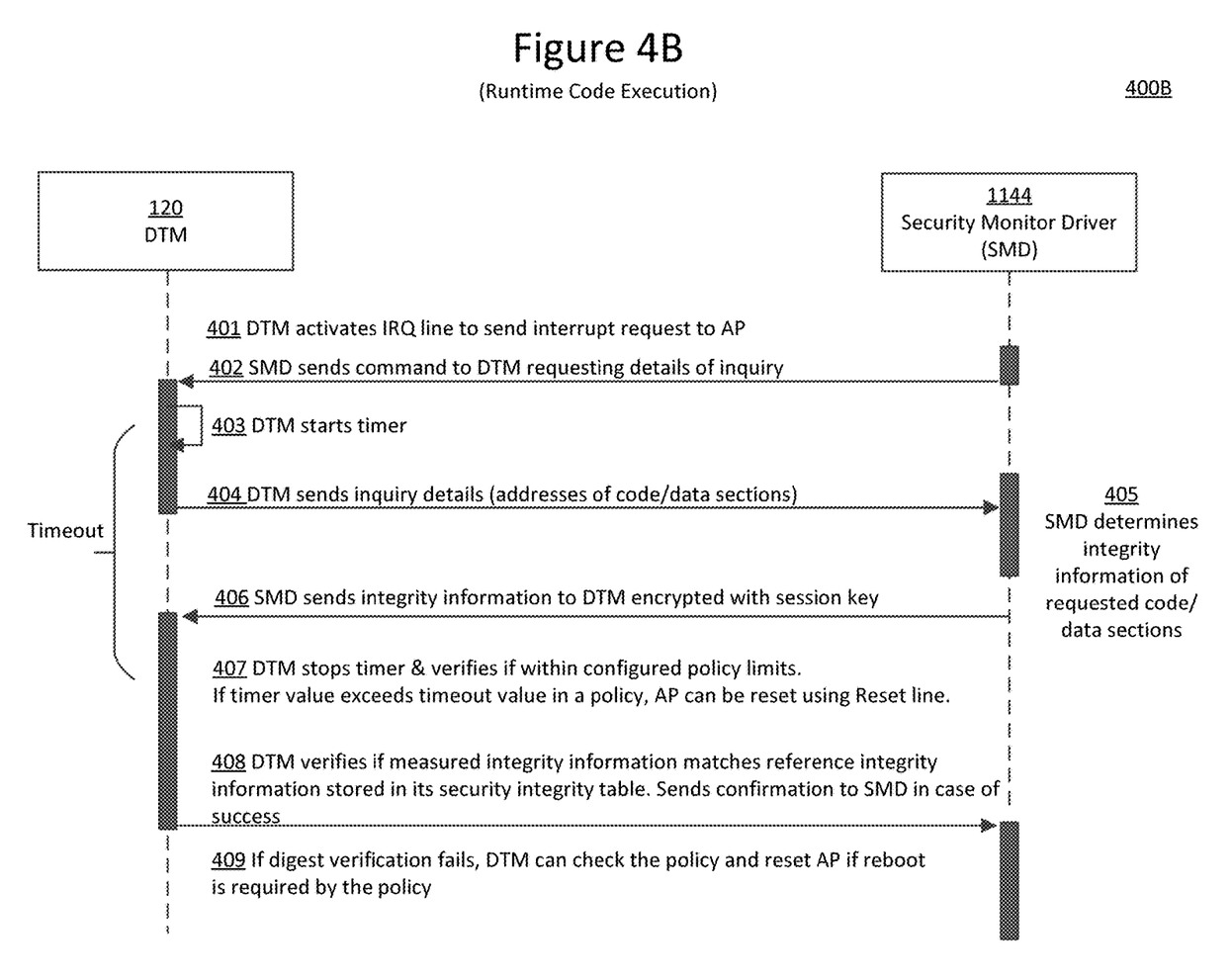
FIG. 4B illustrates a flow diagram of the runtime code execution of FIG. 4A in accordance with aspects of the disclosure.

FIG. 4A illustrates a schematic diagram 400A of the secure system of FIG. 1 performing runtime code execution, and FIG. 4B illustrates a corresponding flow diagram 400B of communication between the DTM 120 and the Security Monitor Driver (SMD) 1144, in accordance with aspects of the disclosure.

By way of overview, during runtime, the SMD 11442 periodically, upon request from the DTM 120, performs an integrity check of its own code, the operating system and the application code. If the DTM 120 determines that something is wrong with an application, the DTE 120 looks to its security policies for an action to perform.

More specifically, during runtime, the security processor 122 is configured to send the AP 112 an interrupt request by activating the interrupt request line IRQ (401). The SMD 11442 sends a command to the DTM 120 requesting inquiry details, such as addresses or code or data section (402). The DTM 120 starts a timer (403) to monitor the integrity verification process based on a preset timeout value; if timeout is reached, the DTM 120 may execute a reset of the embedded system 110.

The DTM 120 sends to the SMD 11442 the inquiry details to request the AP 110 via the SMD 11442 to measure integrity information of code or data stored in the embedded system memory 114 (404). The SMD 11442 measures integrity information for the requested code or data sections (405), and reports to the DTM 120 in encrypted format the measured integrity information (406).

The DTM 120 stops the timer and verifies that the measured time is within policy limits. The security processor 122 is configured to, if the AP 112 running the SMD 11442 does not respond to the request within a predetermined period of time, perform an action indicated by the security policy table, the action being activating a reset of the AP 112 (407). Alternatively, the action may be to block access to cryptographic data or a key stored in the DTM memory 124.

The DTM 120 verifies whether the measured integrity information equals reference integrity information stored in the security integrity table 1244 (408). The integrity information could be, for example, Message Authentication Code (MAC), Keyed-Hash MAC (HMAC), Cyclic Redundancy Check (CRC), or the like. The security integrity table 1244 comprises digests of reference integrity information, with each code or data able to have its own digest. A digest may be based on, for example, a hash, Random Number Generator (RNG), or cryptographic nonce. The code comprises portions of code, and the security integrity table 1244 may comprise a corresponding reference integrity information for the respective portions of code. Also, the code may comprise operating system code or application code.

The security processor 122 is configured to, if the measured integrity information is not equal to the reference integrity information, perform an action indicated by the security policy table 1242 (409). The action indicated by the security policy table 1242 may be to instruct the AP 112 to execute the SMD 11442 to recover the corrupted code or data stored in the embedded system memory 114 from a backup.

Alternatively or additionally, the action may be to activate the interrupt request of the AP 112, or an interrupt request of another AP, Direct Memory Access (DMA), or interface, and request the activated AP 112, other application processor, DMA or interface to request the SMD 11442 to perform a corrective action. The corrective action may be any one or more of erasing the code and/or data stored in a boot media 116 of the embedded system 110, recovering the code and/or data stored in the embedded system memory 114 from a trusted/verified source, and recovering a copy of the code and/or data stored in the boot media 116 from a trusted/verified source.

And alternatively or additionally, the action may be to any one or more of restart the code stored in the embedded system memory 114, directly access the boot media 116 to erase or recover from a trusted source bootloader code, other code, or data stored therein, activate a reset of the AP 112 to cause the AP 112 to restart and repeat the bootloader verification process (407), perform a runtime validation of an AP critical application, code, or data, wherein each of the AP critical application, code, or data has a respective security policy within the policy table, raise a flag via the interrupt request of the AP 112 to notify AP 112 of a threat, restrict use of cryptographic assets (e.g., keys, verification, hashing, signing), and erase bootloader code, a runtime application, or data stored in the boot media 116.

Finally, if the DTM 120 or the SMD 11442 detects an attack, the DTM 120 may lock the embedded system 110 permanently or temporarily by holding the AP 112 in a reset state and using direct boot media access to erase plain text bootloader code, which can be recovered later from a copy of the bootloader code stored inside the DTM 120. The rest of the boot media content is encrypted with key(s) protected by the DTM 120. The DTM 120 can lock itself temporarily to not allow a normal boot until it is unlocked by an administrator. Alternatively, the DTM 120 can permanently and irreversibly cause the secure system 100 to self-destruct by erasing the boot media content and irreversibly locking itself. All security related events can be logged by the DTM 120 and reported to the administrator upon request.

The DTM 120 is advantageous in that it is tamper-resistant from side-channel attacks during a boot process. The DTM 120 does not allow power analysis due to its encapsulation. The DTM 120 may also be protected by sensors, such as temperature sensors.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations, combinations, or variations of the specific embodiments discussed herein.

What is claimed is:

1. A Dynamic Trust Manager (DTM), comprising:
    an interface coupled to an embedded system comprising an application processor and a an embedded system memory configured to store a Security Monitor Driver (SMD);
    a DTM memory configured to store an integrity table storing reference integrity information, and to store a security policy table; and
    a security processor configured to:
        activate an interrupt request of the application processor during runtime;
        request the application processor to execute the SMD to measure an integrity information of code or data stored in the embedded system memory;
        receive from the SMD the measured integrity information of code or data;
        verify whether the measured integrity information equals a reference integrity information stored in the integrity table; and
        when the measured integrity information is not equal to the reference integrity information, perform an action indicated by the security policy table, wherein the action indicated by the policy table is an action selected from the group of actions consisting of:
            instruct the application processor to execute the SMD to recover the code or data stored in the embedded system memory from a backup,
            activate the interrupt request of the application processor, or an interrupt request of another application processor, Direct Memory Access (DMA), or interface, and request the activated application processor, other application processor, DMA or interface to request the SMD to perform a corrective action selected from the group of corrective actions consisting of:
                erasing the code or data stored in a boot media of the embedded system;
                recovering the code or data stored in the embedded system memory from a trusted or verified source; and
                recovering a copy of the code or data stored in the boot media from a trusted or verified source;
            restart the code stored in the embedded system memory;
            directly access the boot media to erase or recover from a trusted source bootloader code, other code, or data stored therein;
            activate a reset of the application processor to cause the application processor to restart and repeat the bootloader verification process;
            perform a runtime validation of an application processor critical application, code, or data, wherein each of the application processor critical application, code, or data has a respective security policy within the policy table;
            raise a flag via the interrupt request of the application processor to notify application processor of a threat;
            restrict use of cryptographic assets; and
            erase bootloader code, a runtime application, or data stored in a boot media of the embedded system.

2. The DTM of claim 1, wherein the integrity table comprises a corresponding reference integrity information for respective code or data.

3. The DTM of claim 2, wherein the code comprises portions of code, and the integrity table comprises a corresponding reference integrity information for the respective portions of code.

4. The DTM of claim 2, wherein the code comprises operating system code or application code.

5. The DTM of claim 1, wherein:
    the DTM memory is configured to store a security policy table,
    the security processor is configured to, when the application processor running the SMD does not respond to the request within a predetermined period of time, perform an action indicated by the security policy table, the action being activating a reset of the application processor.

6. The DTM of claim 1, wherein:
    the DTM memory is configured to store a security policy table, and
    the security processor is configured to, when the application processor running the SMD does not respond to the request within a predetermined period of time, perform an action indicated by the security policy table, the action being blocking access to cryptographic data or a key stored in the DTM memory.

* * * * *